F. W. CUTLER.
FRUIT ASSORTING MACHINE.
APPLICATION FILED MAR. 25, 1915.

1,169,467.

Patented Jan. 25, 1916.
2 SHEETS—SHEET 1.

WITNESSES:

INVENTOR.
Frank W. Cutler
BY
ATTORNEYS.

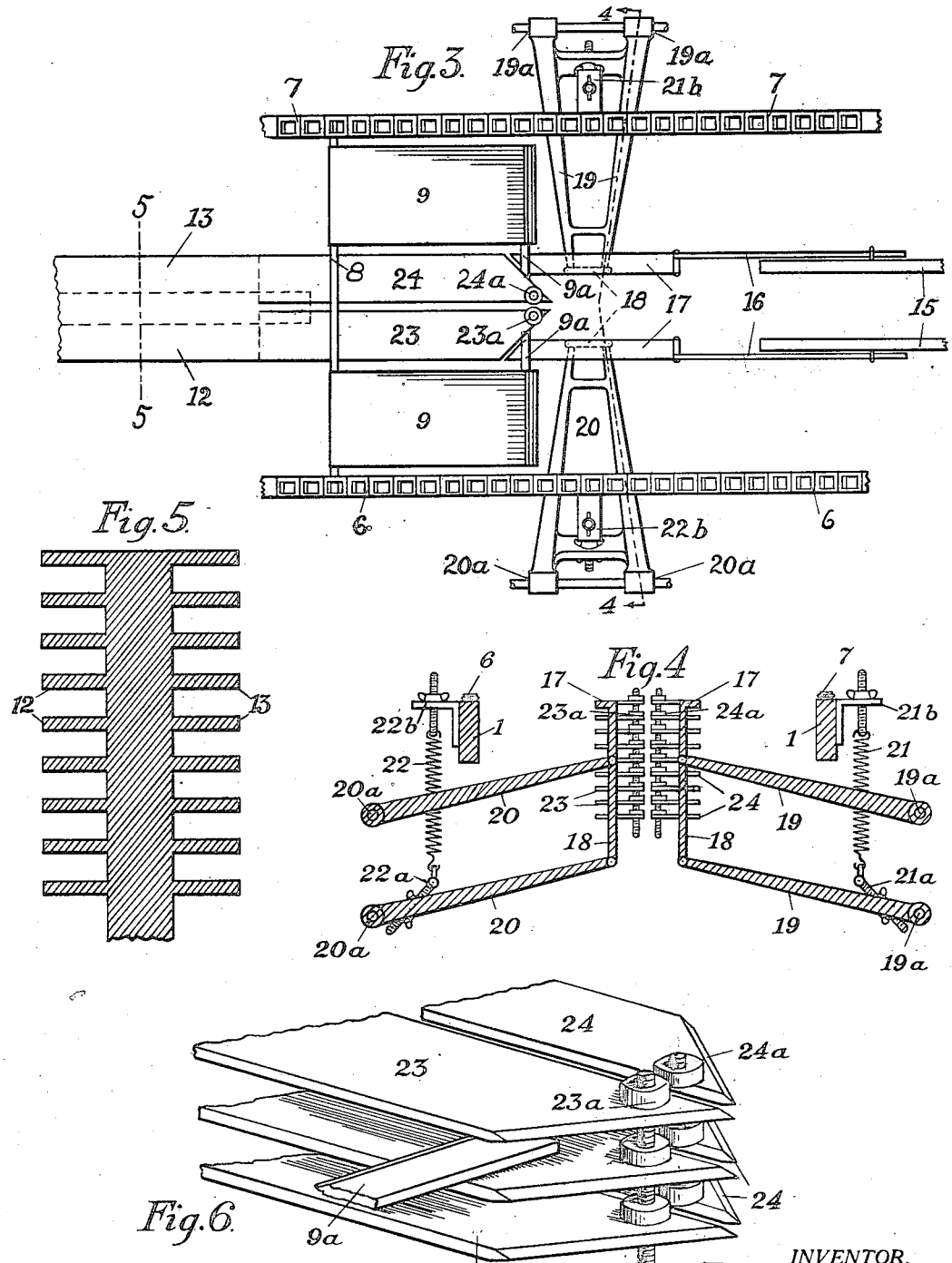

UNITED STATES PATENT OFFICE.

FRANK W. CUTLER, OF HOOD RIVER COUNTY, OREGON, ASSIGNOR TO CUTLER FRUIT GRADER CO., A CORPORATION OF OREGON.

FRUIT-ASSORTING MACHINE.

1,169,467.  Specification of Letters Patent.  Patented Jan. 25, 1916.

Application filed March 25, 1915. Serial No. 16,897.

*To all whom it may concern:*

Be it known that I, FRANK W. CUTLER, a citizen of the United States, residing in the county of Hood River and State of Oregon, have invented certain new and useful Improvements in Fruit-Assorting Machines, of which the following is a specification.

My invention relates to fruit assorting machines, and more particularly to fruit assorting machines which are adapted to sort fruit according to its weight, rather than by size, this being considered a more accurate and reliable method of assorting fruit, especially apples, because of the irregularity in the shape thereof.

The broad idea, as embodied in my invention, contemplates one or more traveling conveyers, each provided with a series of fruit carriers, movable relative thereto, and adapted to be moved across a scale mechanism set in the course of travel of said conveyers, whereby as the conveyer moves each carrier across said scale mechanism, the carrier will depress the scale mechanism according to the weight of the fruit in the carrier, which depression will operate to determine the carrier's position relative to the conveyer in its further travel therewith, and also the location of the discharge movement of the carrier.

In order that others may understand my invention, I have illustrated one practical embodiment thereof, in the accompanying sheets of drawings, which I will now describe.

Figure 1:
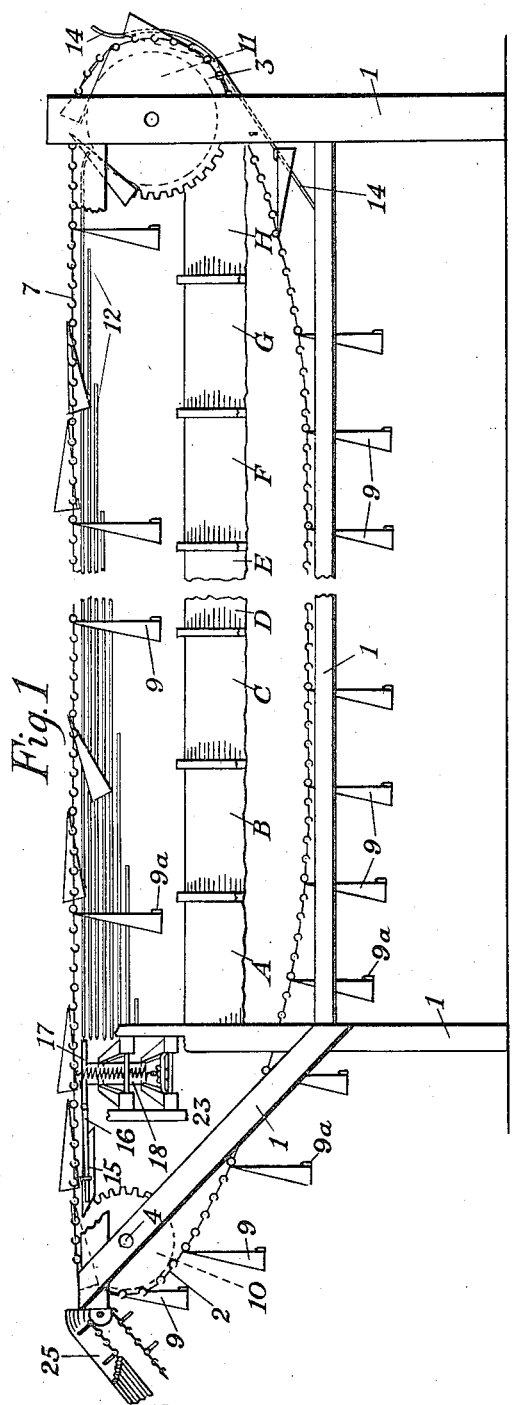
Figure 2:
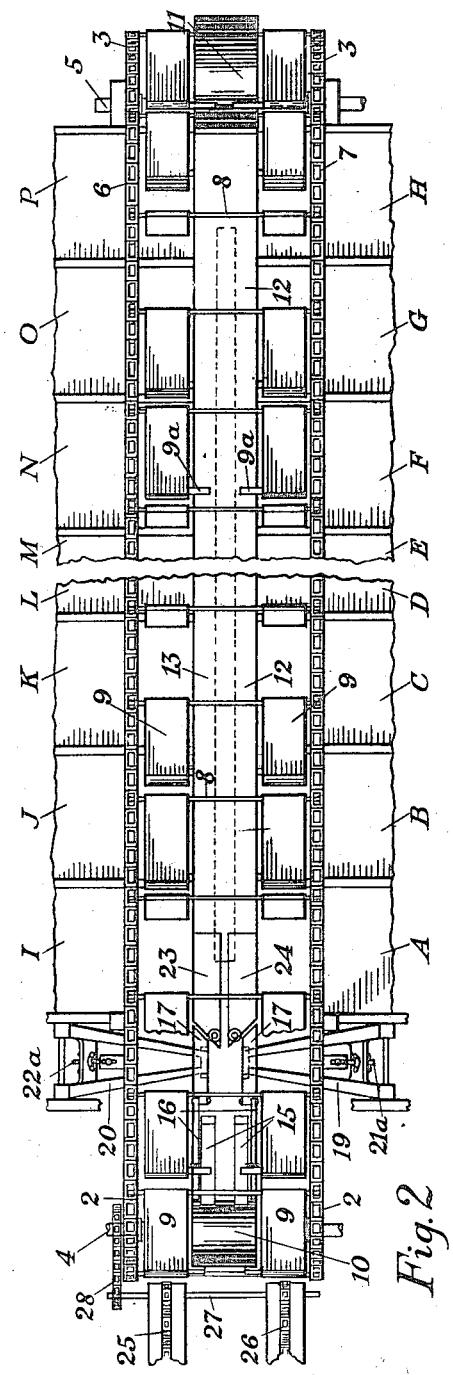

Figure 1 is a side elevation of a machine embodying my invention, with a part broken out to reduce the length of the figure; Fig. 2 is a top plan view thereof; Fig. 3 is an enlarged fragmentary portion, in plan view, at the scale mechanism; Fig. 4 is a cross-sectional view through Fig. 3, on the line 4—4; Fig. 5 is a vertical section view taken on line 5—5 of Fig. 3, through one form of guide-members, leading to various receptacles; and Fig. 6 is a fragmentary, perspective view of the receiving end portions of guide members for receiving the carriers, as they leave the scale mechanism.

Referring now to the drawings, a frame structure of general rectangular form, composed of the frame members 1—1, is provided at its opposite ends with two pairs of sprockets 2—2 and 3—3, mounted upon shafts 4 and 5, upon which sprockets are two conveyer chains, 6 and 7, provided at intervals with cross rods 8—8. Pivotally attached to each of said cross rods, near its opposite ends, and adjacent the sprocket chains, are fruit carriers 9—9, adapted to swing downwardly therefrom, or to move along therewith in a substantial horizontal position, said fruit carriers, in the present embodiment of the machine, being shallow box-like members, tapering toward their attached ends, as indicated, and having open tops, and each provided at its bottom, at the inner side thereof, with a projecting supporting finger $9^a$, for a purpose hereinafter described. Mounted upon the sprocket shafts 4 and 5, between the sprockets, are drum like members 10 and 11, adapted to support the fruit carriers 9—9, as they are moved around the ends of the machine. Supported in said frame structure, at opposite sides thereof, are two series of fruit receiving receptacles, or bins, designated, respectively, A, B, C, D, E, F, G and H, and I, J, K, L, M, N, O and P. These bins, or receptacles, are supported in the structure underneath the upper lap of the conveyer chains, substantially as indicated in Fig. 1. Arranged longitudinally of said machine, in the middle portion thereof, and between the pairs of carriers attached to the cross rods 8—8, are two sets of superimposed guide members, designated respectively, 12 and 13, said guide members being arranged above the receiving bins, and being of different lengths, so that one guide member will terminate immediately above a bin, or receptacle, and the next adjacent guide member will terminate above the next adjacent bin, and so on throughout the length of the machine, as indicated in Fig. 1, all of said guide members starting from the same point and the lowermost guide member terminating over the first bin, and the uppermost guide member terminating over the last bin. An inclined guide member 14, is arranged beneath the drum member 11, and extended upwardly in position to be engaged by the fingers $9^a$, projecting from the fruit carries as they move around said drum 11, to hold said carriers in a way to allow them to gradually move into the hanging position on the lower lap of the conveyer, as said conveyer passes around the end sprockets 3—3.

Mounted adjacent the drum member 10, at the receiving end of the machine, at a space apart, are two fixed supporting bars, 15, adapted to receive and support the carriers 9—9, by means of their projecting fingers 9ª, said bars having hingedly attached thereto, forwardly extending arms 16—16, the forward ends of said arms 16—16, being pivotally attached to supporting top members 17—17, constituting the platforms of a pair of scales, or balancing mechanisms, now to be described. Said platforms 17—17, are mounted at the top of two upright members 18—18, each of which is pivotally supported to the ends of a pair of balancing arm structures 19—19 and 20—20, pivotally mounted as at 19ª—19ª and 20ª—20ª, as clearly indicated in Fig. 4. Said balancing arm structures are yieldingly supported by springs 21—22, attached at their lower ends, to the lower members of said arm structures by means of adjustable screws 21ª and 22ª, and adjustably connected at their upper ends to supporting brackets 21ᵇ and 22ᵇ, mounted on the frame structure 1—1. Thus the tension of said spring members can be regulated and the downward movement of the balancing arm structures, 19—19 and 20—20, controlled. The downward movement of said arm structures, which constitute one form of scale mechanism for my invention, is caused by the fruit carriers moving on to the platforms 17—17 thereof, from the pivoted support extensions, 16—16, as will be clearly understood by referring to the drawings.

Mounted adjacent the opposite or discharging ends of said platforms 17—17, are two sets of superimposed guide members 23 and 24, said guide members being adjustably spaced apart, one above the other, as by means of spacing screws and nuts 23ª—24ª, and being beveled at their receiving ends, and also sharpened, as clearly indicated in Figs. 2, 3 and 6, whereby as the supporting fingers 9ª, projecting from the under side of the carriers 9, pass from the platform members 17—17 of the scale mechanism, they will pass between certain of said guide members 23 or 24, depending upon the weight of the fruit in the carrier and how far downwardly it has moved the scale mechanism. Said series of adjustable guide members 23 and 24, constitute the receiving ends of the fixed guide members 12 and 13, so that as the free end of a carrier 9, supported by its finger 9ª, bears downwardly upon the platform 17, of one of the scale mechanisms, said platform will be depressed according to the weight of the fruit in the carrier, whereupon as the carrier leaves the platform 17, as it is about to do in Fig. 3, it will move on to one of the guide members 23 or 24, and be supported thereby as the carrier is moved along by the sprocket chains 6 and 7, moving on to one of the guide members 12 or 13, as the case may be, by means of which it is supported until it reaches the end of that particular carrier member, whereupon the free end of the carrier is allowed to drop down into a vertical position above the bin beneath the end of said guide member, thereby discharging its load into that bin, or receptacle, as indicated in Fig. 1.

Feed conveyers 25 and 26, are adapted to feed the fruit, piece by piece, into the carriers 9—9, as said carriers move upwardly around the drum 10, at that end of the machine, and assume a horizontal position, as will be clearly understood by reference to Figs. 1 and 2.

The traveling conveyer chains may be driven by any power mechanism desired, applied to either of the shafts 4 or 5, at opposite ends of the machine, and the feed conveyers 25—26, may be driven together through a shaft 27, connected by a sprocket and chain drive to the shaft 4, as at 28, Fig. 2.

By increasing the tension of the springs 21 and 22, which can be done by the screw and thumb nut connections at their upper ends, it will be seen that the scale mechanism can be set so that pieces of fruit of an average weight can be directed from the scale mechanism on to any one of the desired guide plates 23 and 24. Thus as the tension of the springs 21 and 22 is increased to the maximum, the scale members will be held against any depression, except by fruit of a certain weight, and the carriers will be directed on to the top guide member, on which they will move throughout the length of the machine, and if said guide member terminates over the last bin, the finger supporting the free end of the carrier will drop from the end of the guide member and cause the carrier to discharge the fruit into said last bin, or if it is desired, the top guide member may be continued so as to direct the carrier over and around the drum 11, as indicated in dotted lines, Fig. 1, so as to discharge the fruit into any desirable receptacle beyond the end of the machine. If the fruit, or articles, are slightly heavier than those delivered into the last bin, or over the end of the machine, the scale mechanism will be depressed so that the carrier fingers under the free ends of the carriers, will be directed on to the next lower guide member, on which they will move to the end thereof, at which they will swing downwardly and discharge the fruit into the bin immediately underneath the end of said guide member.

The difference in the average weight of the articles delivered to successive bins can be regulated by changing the points of attachment of the lower ends of the springs 21 and 22, relative to the fulcrums, or pivot supports, 19ª and 20ª, of the lower arms 19 and 20. The point of attachment of each relative to said fulcrums can be changed by adjusting the angularly disposed screws 21ª or 22ª, through said lower arms 19 and 20, as indicated in Fig. 4.

The value of adjusting the springs 21 and 22, will be apparent in handling fruit like apples, where it is desired, not only to eliminate certain small sizes, but to regulate the distribution.

It will be understood, of course, that many changes in the details, and as to the capacity of the machine, as described herein for purposes of illustration, can be made without departing from the spirit of my invention, and I do not, therefore, limit my invention to the mechanism here shown, except as I may be limited by the hereto appended claims forming a part of this specification.

I claim:

1. In an assorting machine, in combination, a traveling conveyer, a series of article carriers moving therewith, and movable relative thereto, a series of receptacles, and a scale mechanism interposed in the path of travel of said conveyer, and adapted to yieldingly support each carrier as it is moved across said scale mechanism, and to position it relative to the conveyer, according to the weight of the article being carried.

2. In an assorting machine, in combination, a traveling conveyer, a series or article carriers moving therewith, and movable relative thereto, a series of receptacles, a plurality of guide members leading to said receptacles, and a scale mechanism interposed in the course of travel of said conveyer, and adapted to yieldingly support each carrier as it is moved across said scale mechanism, and to select a guide member therefor.

3. In an assorting machine, of the character described, a flexible traveling conveyer, a series of article carriers connected to travel therewith, and movable relative thereto, a series of receiving bins, a plurality of guide members extending successively to each of said several bins, and a scale mechanism positioned to support said carriers as they are moved thereupon, said scale mechanism being adapted to yield according to the weight of the carrier and its contents, and thereby select a guide member therefor.

4. In a fruit assorting machine, in combination, a flexible traveling conveyer, a series of fruit carriers movably attached thereto, a scale mechanism adjacent said conveyer and across which said carriers are moved, said scale mechanism yielding under the weight thereof, a series of fruit bins, and a plurality of superimposed guide members adjacent said scale mechanism, adapted to receive the fruit carriers from said scale mechanism at different vertical positions.

5. A fruit assorting machine comprising in combination, a supporting structure, one or more endless traveling conveyers mounted thereon, a series of fruit carriers attached thereto, and movable relative thereto, a series of fruit receiving bins, a plurality of guide members and a scale mechanism adjacent the receiving ends of said guide members, adapted to receive and yieldingly support said carriers as they are moved across said scale mechanism, said scale mechanism being adapted to yield according to the weight of the carrier and its contents, and to correspondingly direct the carrier to one of said guide members, substantially as described.

6. An assorting machine of the character described, comprising in combination, a supporting structure, an endless traveling conveyer mounted thereon, with means for driving the same, a series of article carriers attached to said conveyer and movable relative thereto, a scale mechanism adjacent said conveyer and upon which said carriers are moved in their course of travel, a series of receiving bins, a plurality of fixed superimposed guide members of different lengths leading successively to the said several bins, and having their receiving ends adjustable and positioned adjacent said scale mechanism, whereby to receive therefrom, at different positions thereof, said carriers.

7. In an assorting machine, in combination, an endless traveling conveyer, a series of container carrier members pivotally connected thereto at their forward ends and being free to turn completely around their pivotal connections, and guide members arranged adjacent said conveyer and adapted to support and control the movement of the free ends of said carriers during a portion of their travel with said conveyer.

8. In an assorting machine, in combination with a traveling conveyer, a series of article carriers adapted to receive articles, said article carriers having supporting prongs or fingers projecting therefrom, and supporting means along the line of travel of said article carriers upon which said supporting prongs or fingers move to support said article carriers in upright position.

9. In a machine of the character referred to, in combination, a traveling conveyer, a series of article carriers pivotally attached thereto at one end and free to move relative thereto at their opposite ends, said article carriers being provided with projecting supporting fingers at their free ends, a series of supporting guide members of different lengths arranged one above the other, and having their receiving ends in grouped relationship, a series of receiving bins beneath said guide members, and means for automatically directing the supporting fingers on the free ends of said carrier members to different guide members.

10. In a device of the character referred to, in combination with a series of article carriers and means for moving the same, a plurality of guide members of different lengths, arranged one above the other in spaced relationship to each other and having their receiving ends in grouped relationship, a series of receptacles to which said guide members lead, and means for directing said article carriers to any of said guide members.

11. In a fruit distributing machine, in combination with article carriers and means for moving the same over a course of travel, a plurality of receptacles, a plurality of guide members having their receiving ends in grouped relationship and leading thereto, and a yielding support interposed in said course of travel, upon which said carriers are moved, whereby said yielding support directs said carriers, according to the weight of the article carried, to the different guide members.

12. In a grading machine, in combination, a traveling conveyer, a series of article carriers pivotally connected thereto at one end and provided at their opposite ends with supporting prongs or fingers projecting therefrom, supporting means along the course of travel of said article carriers for supporting the latter by said fingers or prongs in upright positions, and means for releasing said article carrier at predetermined locations to permit the same to move into dumping positions.

13. In an assorting machine, in combination, two flexible endless conveyers, article carriers movably supported therebetween, and adapted to support and carry articles placed therein, said article carriers having laterally projecting supporting portions, supporting means along the path of travel of said article carriers upon which said laterally projecting supporting portions move, and a series of receiving bins beneath said supporting means into which said article carriers dump their contents.

14. In a machine of the character referred to, a pair of spaced endless conveyers, article carriers pivotally connected at their forward ends between said conveyers, and provided at their free ends with laterally projecting supporting prongs or portions, a scale mechanism upon which said supporting prongs or portions move, guide members adjacent said conveyers and adapted to receive said supporting prongs or portions from said scale mechanisms at different positions, according to the weight of the article in said article carriers, and a series of receiving bins beneath said guide members into which said article carriers automatically discharge their contents.

15. In an assorting machine, in combination, a traveling conveyer, a series of article carriers pivotally connected thereto at one end and having their free ends movable about their pivotal axis relative to said conveyer, a plurality of guide members adjacent said conveyer, means for supporting the free ends of said carriers upon said guide members, and means for automatically directing said supporting means to different guide members.

Signed at Portland, Multnomah county, Oregon, this 19th day of March, 1915.

FRANK W. CUTLER.

In presence of—
  I. M. GRIFFIN,
  M. M. GILBERT.

Copies of this patent may be obtained for five cents each, by addressing the "Commissioner of Patents, Washington, D. C."